United States Patent

[15] 3,638,885

Reed

[45] Feb. 1, 1972

[54] LAG FREQUENCY SELECTIVE DAMPER

[72] Inventor: Donald A. Reed, Springfield, Pa.
[73] Assignee: The Boeing Company, Seattle, Wash.
[22] Filed: Mar. 9, 1970
[21] Appl. No.: 17,554

[52] U.S. Cl............................244/17.27, 188/283, 188/312, 188/313
[51] Int. Cl.......................................................B64c 27/42
[58] Field of Search.................188/279, 283, 299, 312, 313, 188/318; 244/17.27

[56] References Cited

UNITED STATES PATENTS

| | | | |
|---|---|---|---|
| 2,375,377 | 5/1945 | Mitereff | 188/313 X |
| 1,522,243 | 1/1925 | Hughes, Jr. | 188/283 |
| 2,754,937 | 7/1956 | Buivid | 188/313 |

*Primary Examiner*—George E. A. Halvosa
*Attorney*—Albert W. Hilburger and Joseph M. Corr

[57] ABSTRACT

A frequency selective damper for damping the low frequency natural lead-lag vibrations of an articulated helicopter rotor blade while leaving essentially unaffected the induced one per revolution frequency motion when the rotor is subjected to the combination of these motions. The damper comprises a hydraulic cylinder, a metering-type load valve connected via flow paths to either side of the cylinder piston, a three-way spool valve connected via flow paths to the load valve and to the flow paths connecting the load valve and the hydraulic cylinder, and a control cylinder connected mechanically to the piston rod of the hydraulic cylinder and via flow paths with the spool valve. The displacement of the valve spool is proportional to the time integral of the displacement of the hydraulic cylinder piston. Consequently, when the hydraulic piston rod velocity and the valve spool displacement are both in the extended or retracted mode or sense, the fluid displaced by the hydraulic piston is forced across the load valve. If, however, the piston rod velocity and valve spool displacement are in the opposite sense, the spool valve provides a low resistance bypass around the load valve. This selective bypass provides improved low frequency damping when the damper is subjected to the combined natural and forced vibratory motion.

11 Claims, 10 Drawing Figures

PATENTED FEB 1 1972

INVENTOR:
DONALD A. REED

BY Joseph M. Corr
ATTORNEY

Fig. 4. DAMPER PISTON DISPLACEMENT

Fig. 5. DAMPER PISTON VELOCITY

Fig. 6. SPOOL VALVE DISPLACEMENT

Fig. 7. FREQUENCY SELECTIVE DAMPER FORCE

Fig. 8. CONVENTIONAL DAMPER DAMPER FORCE

INVENTOR:
DONALD A. REED,
BY Joseph M. Corr
ATTORNEY

LAG FREQUENCY SELECTIVE DAMPER

BACKGROUND OF THE INVENTION

This invention relates to a damper for damping the lead-lag vibrations of an articulated helicopter rotor blade. In particular, the invention relates to a frequency selective damper which is adapted to damp the low frequency natural lag motion of a helicopter blade when the blade is being subjected to combined natural and forced vibrational motions.

The blades of a helicopter rotor are subjected to a variety of vibrational forces when rotating about the helicopter hub. In particular, rotors having articulated or hinged blades are subjected to a lead-lag motion which is a motion back and forth in a horizontal plane and a flapping motion in which the blade flaps up and down in a vertical plane. Under normal circumstances, these motions when confined to a reasonable range, are acceptable and in fact necessary for the proper rotation of the rotor system.

There are normally two types of lead-lag motions which are observed in articulated helicopter rotors. One of these is the natural lead-lag motion in which the blade oscillates about the neutral position at its pendulum frequency which is less than once per revolution. This motion is not ordinarily present under steady operating conditions. The other lead-lag motion is a forced once per revolution motion which occurs during flight wherein each blade during the course of one complete revolution experiences significant changes in its velocity. This is readily understood when it is considered that during one-half a revolution the blade is moving against the wind and during the other half revolution, it is moving with the wind. Thus, the blade in one half revolution has a lower apparent velocity and in the other half revolution its apparent velocity is increased by the wind. This velocity change coupled with the once per revolution change in pitch of the blade resulting from control system input act in combination to produce a once per revolution lead-lag force. Thus, when a helicopter is on the ground or in a hovering mode, it is subjected to only natural lead-lag oscillations which will occur if the blades are disturbed. However, in flight, it is subjected to a combined natural and forced, lead-lag motion. This statement, of course, assumes that there is not a significant headwind blowing on the craft during hovering or on the ground, or in other words, it is assumed that in the stationary position of the craft, the airspeed of the blades does not significantly change during the course of a revolution as it would occur during flight.

It is well known that the natural lead-lag motion can produce a force which acts directly on the helicopter to produce vibrations which increase in magnitude to the point where the operation as well as the physical structure of the helicopter are endangered. The explanation for this is the fact that the rotor center-of-gravity is shifted as a result of the natural lead-lag motion wherein the different blades at any one moment are in different positions relative to their neutral position. Thus, for example, in a three-bladed rotor, one blade may be leading while another is lagging and finally the third may be in its neutral position. This causes the rotor center-of-gravity to be shifted from the center of the hub which results in a large unbalanced force. Once initiated, the condition is self-excited unless the lag dampers provide sufficient force to damp the motion and the time required for the condition to subside is directly related to the available damping. When a helicopter is on the ground this phenomenon is observed as a "padding" or rolling motion while in flight the helicopter is seen to "lope" or "wallow".

It is also known that the forced once per revolution lead-lag motions induced on the rotor blades when the helicopter is in flight do not become coupled to the helicopter structure since the blades lead and lag in unison and therefore do not affect the aircraft as do the natural lead-lag motions. Therefore, it is important to note that when the rotor blades experience the combined natural and forced lead-lag motions, it is necessary to damp the natural motions only in order to inhibit oscillations from occurring in the aircraft structure.

Conventional dampers used to damp this natural lag motion can generally be described as shock absorbers and have been found to be effective when the blades are subjected to a pure, natural lead-lag motion. The conventional damper produces a force which is a function of the piston velocity and by definition in the opposite sense from the velocity. When the blades are subjected to the combined natural and forced motions, intervals occur during each cycle of the natural motion where the combined velocity and the velocity of the natural motion are in the opposite sense. Since the sense of the damper force is determined by the combined velocity, the damper force during these intervals aids rather than opposes the natural motion and may be considered as negative damping so far as the natural lag motion is concerned. While the net damping during one cycle of the natural lag motion remains positive, the presence of the negative damping intervals reduces the damper effectiveness in resisting the natural lag motion. As a result, during flight when the blades experience a combined lag motion, the damping force opposing the natural motion is reduced so that the craft can be subjected to oscillations described above.

It is highly desirable, therefore, to provide a damper which is more effective in resisting the natural lag motion under all operating conditions. In other words, it is desirous to have a damper which is frequency selective and can discriminate between the low frequency natural motion and the once per revolution forced motion in order to eliminate the negative damping intervals that reduce the damper effectiveness.

SUMMARY OF THE INVENTION

Therefore, it is a prime object of this invention to provide a frequency selective bypass damper for use in damping the lead-lag motions of an articulated helicopter rotor blade and which is adapted to respond to the natural lead-lag motion of the blade in preference to the forced lag motion. Thus, it is the object of the invention to provide a damping device which is capable of damping the natural lead-lag motion of a helicopter blade in the instances where the blade is subjected either to a pure, natural lead-lag motion or to combined natural and forced lead-lag motions with a minimum decrease in efficiency.

It is an object of this invention to provide a lead-lag damper for use in rotary wing aircraft which is a significant improvement over conventional dampers. In particular, it is an object of the invention to provide means which will enable the damper to be frequency selective and will inhibit the damper from experiencing negative damping relative to the low frequency natural lead-lag motion.

It is still a further object of the invention to provide a lead-lag damper which has a control element in association with a basic damper mechanism wherein the control element comprises a bypass mechanism for permitting fluid flow to bypass the piston of the damper under certain conditions and, therefore, prevents the damper from exhibiting negative damping relative to the low frequency natural motion.

It is a further object of the invention to provide a lead-lag damper with a control element attached thereto wherein the control element comprises a bypass arrangement with a hydraulic cylinder wherein the hydraulic cylinder is mechanically connected to the piston rod of the damper. The control element is responsive to movements of the main damper piston but is out of phase therewith and is capable of rendering the damper frequency selective whereby it increases the effective damping at the natural lead-lag frequency by inhibiting the damper from experiencing negative damping means.

It is still a further object of the invention to have the displacement of the bypass means proportional to time integral of the displacement of the main damper piston. With the particular construction of this invention the bypass means provides a low resistance bypass around the damper under certain conditions so that there is a selective bypassing which greatly improves the low frequency damping of conventional dampers when subjected to a mixed frequency, i.e., natural and forced vibratory motion.

It is still a further object of the invention to provide a control element as generally described above which is easily incorporated in the construction of the conventional lead-lag damper and which comprises a hydraulic cylinder and a bypassing three-way spool valve.

Thus, it is a general object of the invention to provide a lag damper for use in rotary wing aircraft which significantly improves upon the efficiency of the conventional dampers without introducing unreasonable expenses or complexity in manufacture.

Other objects and advantages of the damper of this invention will become apparent from the detailed description of the device which comprises a basic lead-lag damper together with a control mechanism which renders the damper frequency selective and capable of maintaining a high efficiency of damping of the natural lead-lag motion even when subjected to a combined natural and forced lag motion. A damper cylinder houses a conventional piston and rod arrangement within a chamber filled with hydraulic fluid wherein the piston is free to move back and forth in response to oscillations of the rotor blade. Fluid-flow channels permit the flow of fluid from one side of the piston to the other in the normal method of damping.

The control element comprises a bypass three-way spool valve in association with a hydraulic cylinder. The hydraulic cylinder is mechanically linked with the damper piston rod and responds to motion of the blade oscillating about its lag hinge. The hydraulic cylinder is connected through flow channels with the spool valve which in turn is connected via flow channels to the opposite sides of the damper piston. In the instances when the damper is subjected to a pure, natural motion such as when the helicopter is on the ground the damper operates in the manner of a conventional damper. However, when the damper is subjected to a combined natural and forced frequency motion such as when the helicopter is in flight it favors the natural frequency by eliminating the negative damping intervals experienced by a conventional damper. The bypass valve spool has a displacement which is proportional to the time integral of the damper piston displacement. Therefore, in those instances, when the displacement of the spool valve and the velocity of the damper piston are in the same direction, i.e., in the retract or in the extend position, there is damping of the natural lag motions. However, a low frequency bypass is achieved and no damping occurs when the valve spool displacement and the total damper piston rod velocity are opposite each other. In conventional dampers, it is at this point when negative damping is present.

DESCRIPTION OF THE PREFERRED EMBODIMENTS

In the following description particular dampers will be described in order to illustrate the basic features of this invention. However, it is to be understood that this description is to be in no way limitative of the scope of the invention since the principles of the invention can be easily applied to many conventional dampers presently available and suitable modifications can be made to the damper which would be obvious to those skilled in the art. In addition, although the damper will be described as being applied to the rotor and blades of a helicopter it is not limited thereto but rather can be used in other applications wherein one body moves with respect to another and it is desirous to damp the oscillations of the moving body.

Figure 1:
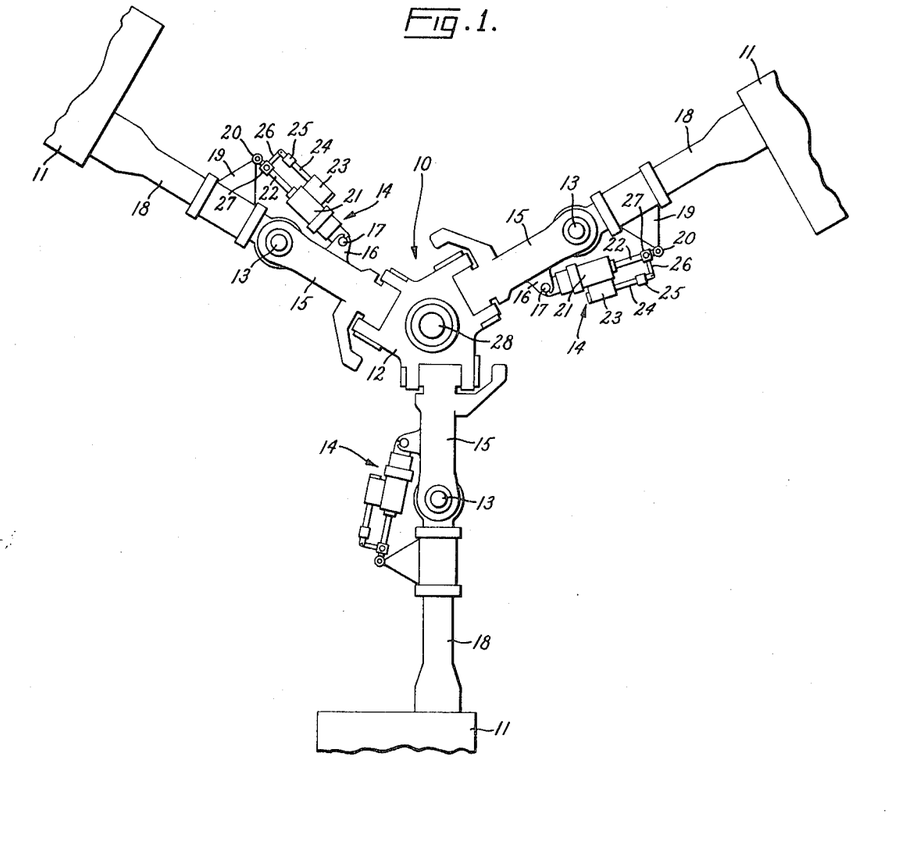
FIG. 1 shows a three-bladed rotor with a damper of this invention mounted to each blade.

Turning now to FIG. 1 there is shown a simplified drawing of a helicopter rotor 10 having three blades 11 mounted to hub extension arms 15 which are connected to a hub 12. The hub is driven by a drive shaft 28. In the normal rotor there may be more couplings and various hinges which are not shown in the drawing as they are not necessary in this description.

However, there is shown lag hinge 13 which permits the blades to oscillate in the horizontal plane with respect to the rotor hub. Connected across each lag hinge is a damper 14 of this invention which is attached at the inboard side of the hinge to a lug 16 by means of a pin 17. At the outboard side of the hinge 13, the damper is mounted to the root 18 of the blade by means of a lug 19 and pin 20.

Each damper 14 is shown as comprising a main damper cylinder 21 which has its damping piston rod 22 extending from one end and connected to the lug 19. Mounted on top of the main damper cylinder is a second cylinder 23 which is a control element having a piston rod 24 extending out from one end and connected through a force transfer mechanism such as an axial spring capsule 25 to the main damper piston rod 22 by means of a drive arm 26 rigidly coupled to the rod 22 at point 27. It is, therefore, seen that the control element piston rod 24 is responsive to motions of the main damper piston rod 22 through the forces produced by the spring capsule 25.

It will be seen in a further description of this invention that the control element is adapted to enable the damper to be frequency selective and to damp the natural lag motions of the blade about its lag hinge even when subjected to the combined natural and forced vibrations.

Since we are talking here of a three-bladed rotor it is common to refer to the natural lag motion as "one-third per rev" motion and to refer to the forced lag motion as "once per rev" motion. Therefore, throughout the remainder of the discussion the natural and forced motions will be so referred to and the combined motion will be referred to as one plus one-third per rev motion. As stated previously, one-third per rev motion exists as natural oscillations of the blades about their lag hinges during rotation and the forced once per rev motion exists when the helicopter is in flight and the blades are experiencing significant changes in apparent velocity as a result of moving in the direction of the wind during half the revolution and moving against the wind in the other half of its revolution. The forced once per rev motion has been found in the past to mask the one-third per rev motion so that conventional dampers act principally on the once per rev motion and its efficiency in damping the one-third per rev motion is significantly decreased. However, as mentioned previously, the damper of this invention is capable of increasing the damping of the one-third per rev motion which is the motion that is coupled to the helicopter structure and causes vibrations therein.

Figure 2:
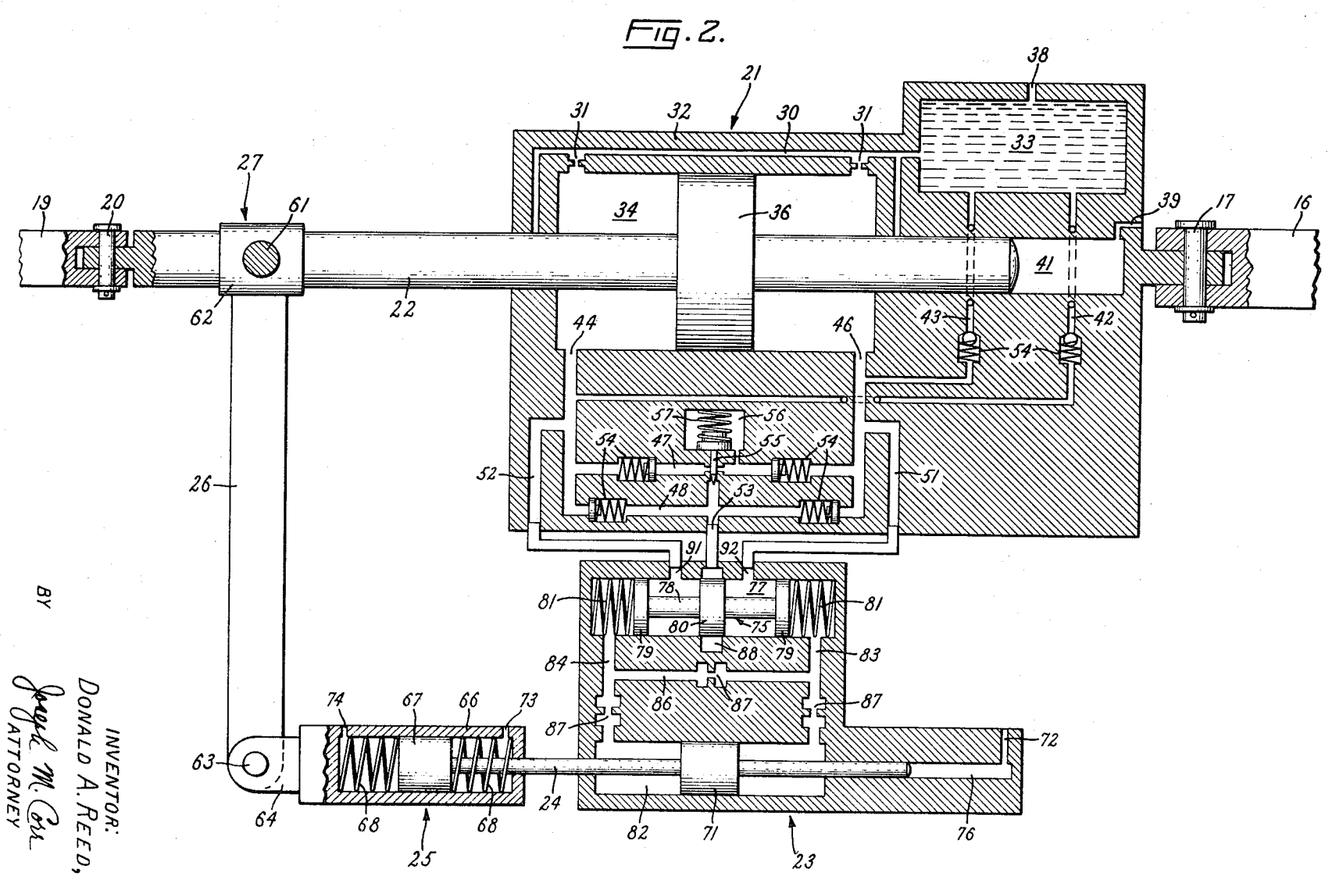
FIG. 2 is a detailed drawing in section of a damper of this invention.

FIG. 2 is a detailed drawing in section of a specific embodiment of this invention. This particular embodiment is presumed to be the damper 14 shown in FIG. 1 and for ease of explanation and understanding, reference numbers common to both FIGS. 1 and 2 have been retained. It is to be understood, however, that this is not meant to limit in any way the scope of this invention and that the embodiment of FIG. 2 is one of a variety which fit within the spirit and scope of the invention. The alternative embodiment of FIG. 3 further illustrates the invention and reference numerals which would be common to FIGS. 1, 2, and 3 were not used in FIG. 3 in order to avoid the possibility of any undue confusion.

Turning now to FIG. 2 there is a detailed drawing in section of the damper which comprises a conventional damper 21 and the control element 23. The particular type of conventional damper shown is oftentimes referred to as a preloaded damper because of the use of a preloaded metering valve which controls the relationship between damper force and piston velocity. Therefore, the damper comprises a cylinder 32 having a reservoir 33 for the hydraulic fluid and a cylinder chamber 34 occupied by a piston 36 connected to a piston rod 22. The piston divides the chamber 34 into two variable volume compartments and is free to move back and forth in the chamber in response to oscillations of the blade. The piston moves in response to motion of the blade because of the connection of the piston rod to the blade root by the lug 19 and pin 20 arrangement which is better viewed in FIG. 1. Orifices 38 and 39 are air exhaust orifices and bore 41 permits back and forth motion of the piston rod 22. Passageway 30 serves as a seal drain while constricted ports 31 enable one manually to move piston 36 which may be required when mounting the damper on a blade. Flow channels 42 and 43 supply hydraulic fluid from the reservoir 33 to flow channels 44 and 46, respectively, and to the opposite sides of piston 36. Branch flow lines 47 and 48 interconnect lines 44 and 46 while flow channels 51, 52 and 53 interconnect the control element 23 and the damper 21. A series of one-way check valves 54 are positioned in the various flow lines while load-type metering valve 56, comprising metering pin 55 and spring 57, is positioned at the junction of flow lines 47 and 53. This spring loaded metering valve serves the purpose of controlling the relationship between damper force and velocity of the basic conventional damper as determined by the design of the metering pin 55 and the force of spring 57.

At the upper right-hand side of the Figure there is shown the pin 17 and lug 16 arrangement for connecting the damper to the hub extension arm 15 which can be better viewed in FIG. 1. Drive arm 26 is shown connected rigidly by means of pin 61 and clamp 62 to the piston rod 22 of the main damper piston and at the other end it is connected by means of pin 63 to the clevis 64. The clevis in turn is an integral part of the spring capsule housing 66 having therein a piston 67 between compression springs 68 located at each end of the housing. Piston 67 is connected by means of a common piston rod 24 to a hydraulic cylinder piston 71 within the control element 23.

The coupling between damper piston rod 22 and hydraulic piston 71 has been shown as comprising a drive arm 26 rigidly connected to the rod 22 and a spring capsule 25. A different type of force transfer mechanism could be used in place of the spring capsule such as a combined dashpost and spring capsule arrangement depending on the desired characteristics. In addition, instead of rigid arm 26, a linkage arrangement could be used to change the amplitude ratio between the piston rod 22 and the force transfer mechanism 25, i.e., the input to the spring capsule. In such an arrangement, a lever could be pivoted at a point on rod 22 and on the damper housing 32 and pivoted at the input to the spring capsule. Modifications obvious to one skilled in the art could be made to tailor the device to meet desired operating characteristics.

For the purpose of this discussion, there will now be defined the terms "extend" and "retract" with respect to the motions of the main piston. When the piston 36 moves towards the left it will be referred to as the extend direction whereas if it moves toward the right it will be referred to as the retract direction. As a result of the drive arm 26 and spring capsule 25 arrangement connecting the hydraulic cylinder piston 71 to the damper piston rod 22, it will be seen that when the damper piston rod moves in the extend direction the spring capsule exerts a force on the piston in the hydraulic cylinder towards the left which for that cylinder will also be the extend position. Therefore, it is clear that the extend and retract directions of the hydraulic cylinder piston 71 are the same as the extend and retract positions of the main damper piston. Likewise, if the hydraulic cylinder piston 71 has a velocity to the left, hydraulic fluid is forced through passages 83, 84 and 86 causing the valve spool 75 to move to the right. The extend and retract directions of the valve spool 75 are, therefore, opposite those of the main damper piston. It should be noted here that the motion of the hydraulic cylinder piston will be out of phase with the damper piston because the fluid in the control element slows that piston's movement. Orifices 72, 73 and 74 shown at the end of the channel 76 in which the piston rod moves and in the housing 66 are for air exhaust and pressure equalizing purposes.

Shown in the chamber 77 of the control element is a three-way spool valve 75 having a common rod 78 and lands 79 and middle land 80 with centering springs 81 at either end. The spool valve is free to move back and forth in the chamber 77 under the influence of springs 81 and of hydraulic fluid forced from chamber 82 through flow lines 83 and 84 as a result of movement of piston 71. Another fluid channel 86 interconnects lines 83 and 84 and thereby connects one side of the hydraulic cylinder piston 71 to the other. Constrictions 87 control the rate of flow of hydraulic fluid through various flow lines. The number and exact location of these constrictions can be varied by choice.

It was mentioned previously that flow lines 51, 52 and 53 interconnect control element 23 and damper 21. To be precise these lines connect the spool valve chamber 77 with the damper and, therefore, when the spool valve is in certain locations, fluid is capable of flowing from the damper into chamber 77 and back into the damper. Consequently, the motion of the spool valve will have an effect on the fluid flow in the damper and as a result will effect the hydraulic force on main damper piston 36. Therefore, motion of the spool valve will effect the damping force exerted by the damper on the blade oscillations.

The damper in FIG. 2 is shown in a static condition wherein all the elements are at rest and in particular the three-way spool valve 75 is centered in the control element under the influence of centering springs 81. With this location of the spool valve the middle land 8 closes off the outlet port 88 so that any fluid entering the chamber 77 via inlet ports 91, 92 is not able to flow out. This static condition, therefore, simply corresponds to a stabilized condition wherein hydraulic fluid pressure is equalized throughout and no forces are acting on any of the movable parts.

Figure 2A:
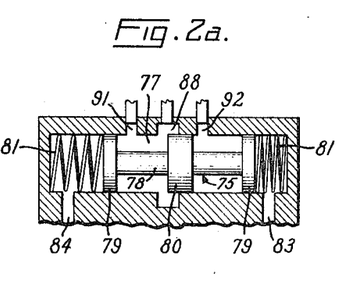
FIG. 2a is a sectional view of a portion of FIG. 2 illustrating the spool valve of the control element displaced to the right.

FIG. 2a is a sectional view of a portion of FIG. 2 showing the spool valve displaced to the right off center so that the middle land 80 no longer closes outlet port 88. Therefore, fluid can flow through inlet port 91 into the spool valve chamber 77 and out outlet port 88. The spool valve has moved to this position as a result of fluid being forced out of chamber 82 upward through channel 84 into the left end of the spool valve causing a pressure differential to exist whereby the valve 75 is forced towards the right compressing the centering spring at the right end while extending the centering spring at the left end. This motion of the valve spool is the result of the hydraulic piston 71 being extended towards the left in response to the lead-lag motion of the blade.

FIG. 2b again is a sectional view of a portion of FIG. 2 showing the valve spool moved towards the left off center so that hydraulic fluid is capable of flowing into the valve spool chamber 77 through inlet port 92 and out of the chamber by means of outlet port 88 which has been opened by the center land 80 being shifted towards the left. Similarly, as in FIG. 2a, hydraulic fluid has been forced up through channel 83 to exert a force against the right hand end of the valve spool causing the valve to move towards the left compressing the centering spring at the left end while extending the centering spring at the right end. The hydraulic fluid has been forced by means of the movement of the hydraulic piston 71 towards the right or the retract direction in response to the lead-lag motion of the blade.

Figure 3:
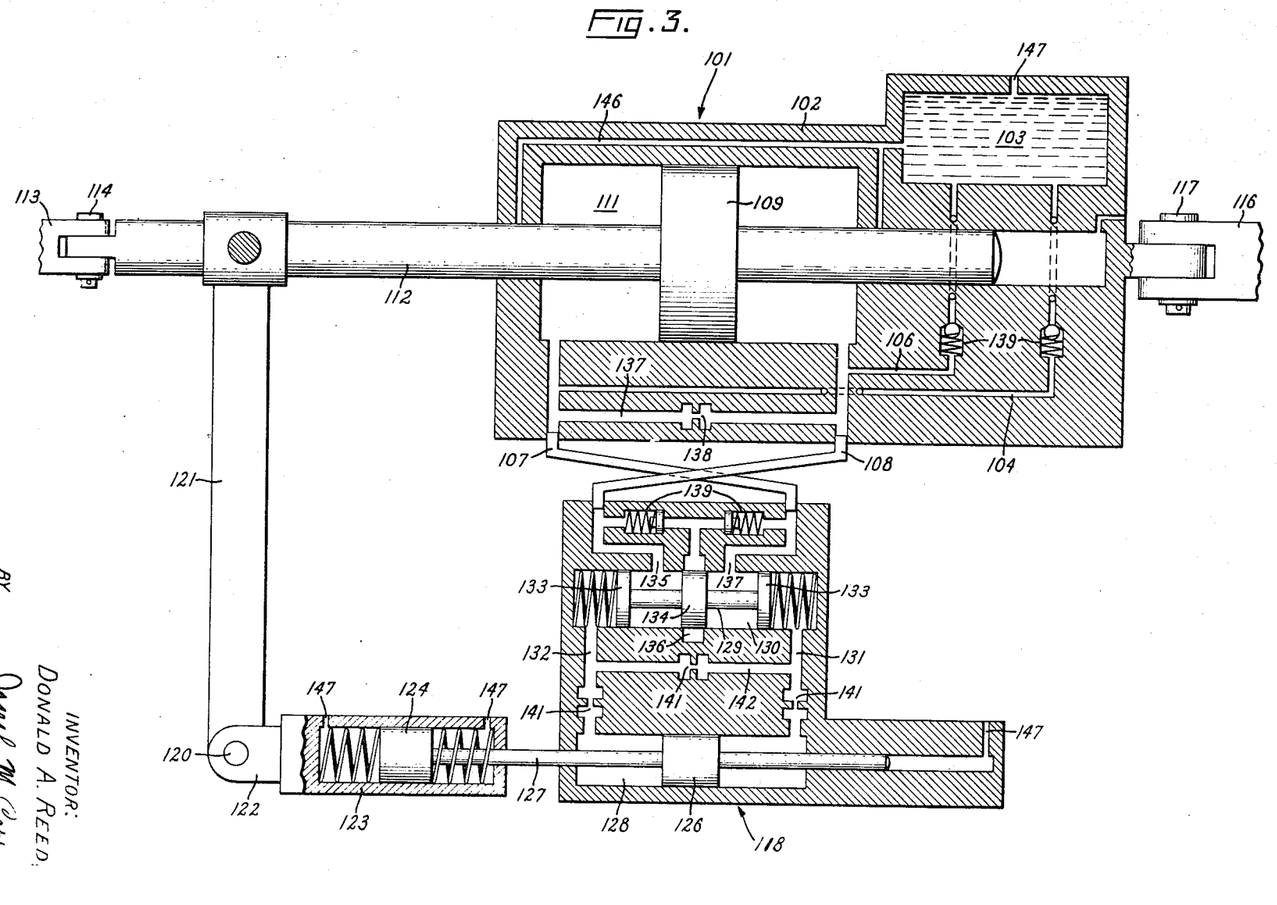
FIG. 3 is a detailed drawing in section of an alternative damper.

FIG. 3 shows an alternative damper of this invention wherein the control element is now associated with a type of damper normally referred to as a viscous type. In this manner, the damping force of the damper is related to the velocity squared of the piston motion. The purpose of this figure, therefore, is to show the adaptation of the control element to another conventional-type damper and thereby illustrate the ease with which the control element can be easily modified and incorporated into various basic dampers.

The damper 101 is shown having a housing 102 with a hydraulic fluid reservoir 103 which has flow channels 104 and 106 leading therefrom to interconnect with fluid channels 107 and 108 and to supply the fluid to the opposite sides of the main damper piston 109 in chamber 111. The external features of this damper are the same as those in FIGS. 1 and 2 wherein the piston rod 112 is coupled by means of a lug 113 and pin 114 to the root of the blade (not shown). At the opposite end the housing 102 is connected by means of a lug 116 and pin 117 to the hub extension arm (not shown). The control element 118 and the damper 101 are interconnected by means of flow channels 107, 108 while drive arm 121 is coupled by means of pin 120 and clevis 122 to spring capsule housing 123 to elastically couple piston rod 112 with cylinder 123. Spring capsule piston 124 in cylinder 123 is connected to hydraulic cylinder piston 126 by rod 127. The hydraulic cylinder piston chamber 128 communicates with the opposite ends of the three-way valve 129 spool by means of flow channels 131, 132. The spool valve has end lands 133 and middle land 134 with the center land shown covering the outlet port 136. The valve spool is centered in its chamber because the damper is shown in a static condition. Branch flow line 137 interconnects lines 107 and 108 and has a constriction 138 to control fluid flow rate. One-way check valves 139 are shown in various fluid lines together with constrictions 141 in the flow lines 131, 132 and 142 of the control element.

The three-way valve spool of the control element shown in FIG. 3 is adapted to move from left to right in response to a pressure differential at its left or right ends and thereby is enabled to open or close the outlet port 136 to permit fluid flow into and out of the valve spool chamber 130. The inlet ports are indicated at 135 and 137. Therefore, the motions of the spool valve are similar to those shown in FIGS. 2a and 2b.

The drainage lines 146 in the main damper cylinder as well as the exhaust ports 147 shown in the damper and the control element serve the same functions as those shown in FIG. 2.

There will follow now an analysis of the operation of the damper shown in FIG. 2 under dynamic conditions wherein the blade is rotating and experiencing lead-lag vibrations. It is necessary to give this dynamic explanation since it is not possible to explain the operations of the damper from static considerations because the motions of the hydraulic cylinder piston 71 and valve spool 75 are not necessarily in phase with respect to the motions of the main damper piston 36. Thus, the motions of the control element members do not respond immediately to the lead-lag motions of the blade, and therefore, cannot be described in a static cause-and-effect manner. A brief description will now follow of the mathematics involved in the operation of the damper when subjected to a combined one plus one-third per rev motion. The mathematical statements have been simplified to permit a solution by ordinary means and are not intended as a complete statement of the mathematical relationships involved.

Referring therefore to FIGS. 1 and 2, it is assumed that the rotor is rotating and the blades are experiencing the combined one plus one-third per rev lead-lag motion. In response to the lag oscillations, it is now assumed that the piston 36 of the damper is displaced in the extend direction, i.e., toward the left a distance X. As a result of this displacement, and because of the spring capsule 25 which mechanically links the damper piston rod 22 and the hydraulic cylinder piston 71 of the control element a force to this left is exerted on the latter. Resistance of the hydraulic fluid in chamber 82 causes a response time delay wherein the hydraulic piston 71 does not move precisely in phase with the piston rod 22 and a differential pressure across the hydraulic cylinder piston 71 is produced. This pressure differential is proportional to the damper displacement and can be expressed approximately as KX where K is the combined spring constant of springs 68.

The pressure differential produces a flow of hydraulic fluid from the high-pressure side to the low-pressure side of piston 71 via flow lines 83, 84 and 86. The rate of this flow naturally is determined by the control orifices 87 and causes a displacement of the valve spool. The flow rate Q is approximately proportional to the pressure differential and the displacement Y of the valve spool is approximately proportional to the time integral of the flow rate Q.

Substituting KX for the pressure differential as developed above, it is apparent that the flow rate Q is approximately proportional to KX and, thus, the time integral of the flow rate Q is proportional to the time integral of X. Therefore, the final relationship resulting from this analysis states that the spool valve displacement Y is proportional to the time integral of X, the main damper piston displacement.

Figure 4:
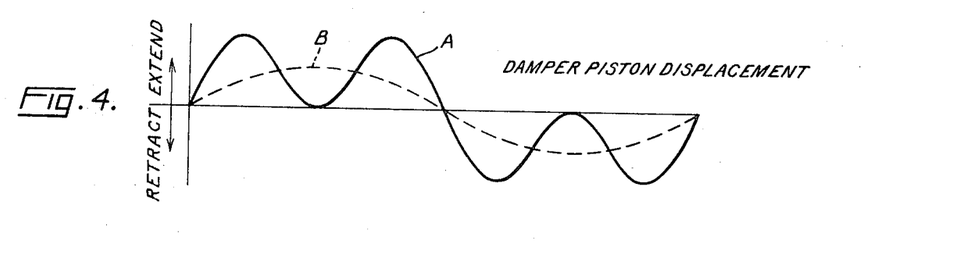
FIG. 4 is a curve depicting the main piston displacement under an assumed combination of natural and forced lead-lag motions.
Figure 5:
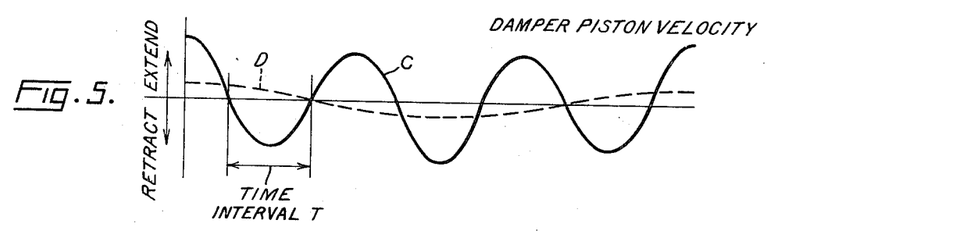
FIG. 5 is a curve showing the characteristic velocity curve of the damper piston when subjected to the combined motion of FIG. 1.
Figure 6:
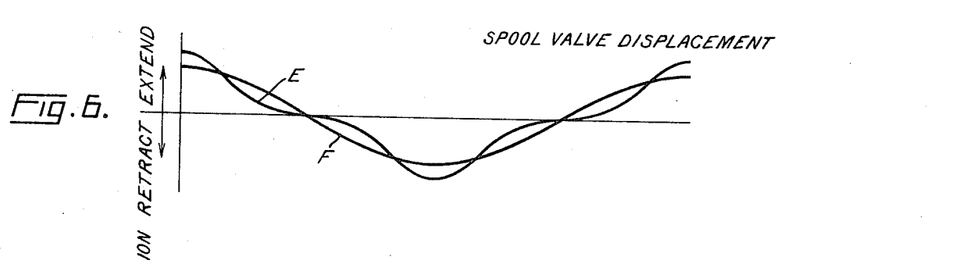
FIG. 6 is a curve illustrating the displacement of the control element valve spool when the damper is subjected to the combined motion of FIG. 1.

FIGS. 4 to 8 graphically illustrate what occurs when the damper of this invention is subjected to combined one plus one-third per rev motion. Briefly outlined above were the mathematical relationships existing between the components of the basic damper 30 and the components of the control element 31. In particular, it was pointed out that the displacement Y of the valve spool 75 can be generally represented by the time integral of the displacement X of the damper piston 36. As pointed out previously, it is necessary to give a dynamic explanation of the operation of this invention since various elements are out of phase with each other during operation of the damper, and, therefore, a simple static flow description would be inadequate. With the aid of the graphical illustrations of FIGS. 4 to 8 the dynamics of the system can be better understood and explained. The curves in FIGS. 4, 5, and 6 are not drawn to scale, but illustrate certain wave shapes.

The curves in FIG. 4 describe the displacement of main damper piston 36 when subjected to a combined one plus one-third per rev motion. As indicated in the Figure, the points above the abscissa correspond to the piston rod being moved in the extend direction while points below relate to the piston rod being retracted. The solid curve A traces the total displacement of the damper piston which is the sum of the displacements resulting from the once per rev and the one-third per rev components. The dashed line B indicates the one-third per rev component of curve A and it is assumed that the one-third per rev component and the once per rev component are equal in amplitude.

In FIG. 4, therefore, it can be seen that the piston 36 when subjected to a combined one plus one-third per rev motion is first extended, returns to a neutral position and is extended again before retracting and then going neutral and again retracting.

FIG. 5 represents the velocity of the damper piston when subjected to the combined oscillations. Again, points above and below the abscissa relate to the extend and retract direction respectively. The solid curve C corresponds to the total velocity of the piston while the dashed line D relates to the one-third per rev component of the total velocity. These curves, therefore, represent the time derivatives of the displacement curves shown in FIG. 4. In reading FIGS. 4 and 5, together one is able to determine damper piston position and the direction of its velocity. The corresponding information about the one-third per rev motion may similarly be retrieved from the two Figures.

FIG. 6 shows a curve E which is the result of a mathematical analysis of the valve spool 75 displacement when the damper is being subjected to the combined one plus one-third per rev motion, while curve F depicts the one-third per rev component of the total displacement E. Therefore, these curves indicate the motions of the valve spool during the period when the piston 36 is experiencing the displacement and velocity as shown by the curves in FIGS. 4 and 5. The points above and below the abscissa again relate to the extend and retract direction, respectively, and in comparing FIG. 6 with FIG. 5 it can be seen that curve E closely approximates curve F and generally is in phase with the one-third per rev velocity component shown as curve D. As a result the valve spool displacement is approximately in phase with the one-third per rev velocity component and is not being affected by the once per rev component to any significant degree. Thus, the valve spool is moving back and forth in its chamber opening and closing the exit port 88 permitting bypass flow of the fluid around the main damper piston 36 at the proper times to permit damping of the one-third per rev component and avoid negative damping thereof. As will be shown subsequently, damping of the one-third per rev component occurs when the valve spool displacement shown in FIG. 6 is in-phase, i.e., in the same direction as the total velocity of the damper piston shown in FIG. 5 as curve C. No damping will occur when the valve spool displacement is in the opposite sense, the opposite direction of the total velocity of the piston. Therefore, comparing FIGS. 5 and 6, those periods when damping will occur can be determined simply by picking out the areas where the two curves C and E are in-phase with each other.

Figure 7:
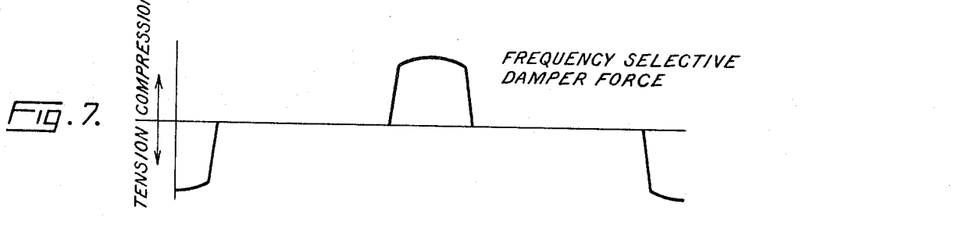
FIG. 7 shows the damper force and the periods during which damping occurs using the damper of this invention, assuming ideal action of the bypass valve.

FIG. 7 graphically illustrates the periods when damping of the one-third per rev component occurs. Therefore, FIG. 7 represents the force exerted on piston 36 and the points above the abscissa relate to compression forces while the points below the horizontal line relate to the tension forces. In particular, these curves relate to this damper of this invention and as can be seen they correspond to the areas wherein curves C and E are in-phase. The selective periods of time wherein damping occurs as shown in FIG. 7 indicate the frequency selective aspects of this invention since if damping occurred at other points in time there would be negative damping which is an actual reinforcement of the one-third per rev component. This latter point can be illustrated but comparing FIGS. 7 and 8.

Figure 8:
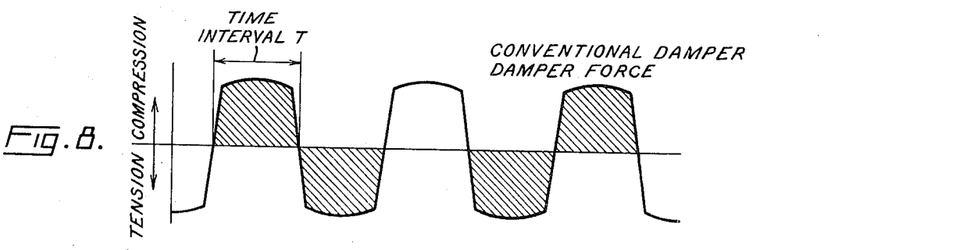
FIG. 8 shows the damper force and the periods during which damping occurs, including negative damping, when a conventional damper is used.

FIG. 8 graphically illustrates the characteristic damping forces exerted by a conventional damper when subjected to the combined one plus one-third per rev motion. Just as in FIG. 7, the curves relate to the forces exerted on the damper piston and the points above the abscissa are compression forces and points below are tension forces. Unlike FIG. 7, it can be observed in FIG. 8 that damping is always occurring when using the conventional damper. The cross hatched areas indicate the time intervals during which negative one-third per rev damping occurs with the conventional damper as may be substantiated from an examination of FIGS. 5 and 8 during the time interval T. During this interval, the one-third per rev component of the damper piston velocity, curve D of FIG. 5 is in the extend direction. By definition, a positive damping force must oppose this extending motion of the damper which means that the damper must be in tension. However, FIG. 8 shows the damper force is compressive which constitutes negative damping relative to the one-third per rev component of the damper motion. Therefore, with the conventional damper it is seen that quite often the one-third per rev component is being reinforced which is undesirable.

The response of the damper to a pure one-third per rev motion may also be deduced from examination of FIGS. 5 and 6. In the case when the imposed motion is a pure one-third per rev, the total damper piston 36 velocity is represented by curve D of FIG. 5 and the once per rev perturbations of the spool valve 75 displacement evident in curve E of FIG. 6 will disappear so that the spool valve displacement conforms to curve F. Under these conditions, there will be no bypassing action since the damper piston 36 velocity and the spool valve 75 displacement are always in-phase. Therefore, when subjected to a pure one-third per rev motion the damper behaves as a conventional damper. It is obvious that the preceding is valid for any discreet frequency motion and it may, therefore, be stated that the damper will respond as a conventional damper whenever it is subjected to a discreet frequency motion.

Figure 2B:
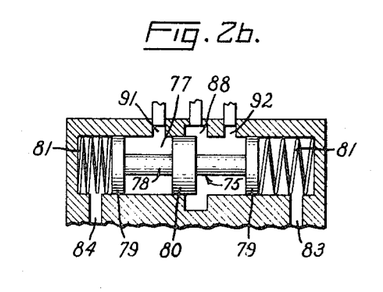
FIG. 2b is also a sectional view of a portion of FIG. 2 illustrating the spool valve of the control element displaced to the left.

Referring to FIGS. 2, 2a, and 2b which illustrate the various positions of the valve spool 75, a description of the flow of hydraulic fluid throughout the damper will be given corresponding to the different positions of the valve spool. Although a static flow description is inadequate to describe motions of the damper elements, it is possible to give such a description as to flow of hydraulic fluid when the various elements are assumed to be in certain positions. Thus, in these Figures, the spool 75 is presented in different locations and the effects on the damper will now be described and related to FIGS. 5, 6 and 7. The discussion will relate to FIG. 2a and 2b since FIG. 2 corresponds to the conditions wherein fluid cannot flow into and out the spool valve chamber 77 since the middle land 80 blocks the exit port 88.

Referring to FIG. 2a, the spool valve 75 is shown off center to the right after having been forced there by pressure from liquid entering the left and via channel 84 as a result of movement of hydraulic piston 71 (FIG. 2) to the left or extend direction. Assuming the spool valve to be held momentarily in position as in FIG. 2a which corresponds to the extend direction of FIG. 6, two situations will be considered.

a. In the first situation the damper piston 36 velocity is assumed to be in the extend direction, i.e., the piston is moving to the left and building up pressure in that section of the chamber 34. The fluid is forced down fluid lines 44 and 52 into the spool valve chamber 77 via inlet 91. The fluid flows out of the spool valve chamber by means of port 88 and is forced across load valve 57 and through check valve 54 at the right end of fluid line 47. The fluid then flows up line 46 into the right-hand side of the chamber 34. Therefore, damping has occurred in this instance since the fluid has been forced across the load valve and this corresponds to the period of time when the damper piston velocity, curve C in FIG. 5, and the valve spool displacement, curve E in FIG. 6, are both in the same sense, i.e., both are in the extend sense.

b. In this situation, the damper piston 36 velocity is assumed to be in the retract direction, i.e., the piston is moving toward the right and building up fluid pressure in that part of chamber 34. The fluid is forced down flow paths 46 and 51. However, since the center land 80 prevents fluid flow between inlet port 92 and outlet 88, the fluid is forced across the check valve 54 at the right end of fluid line 48. Following the path of least resistance, the fluid then flows into the spool valve chamber 77 via port 88 and out thereof via 91, thereby flowing up fluid lines 52 and 44 into the left-hand side of chamber 34. As a result, load valve 57 has been shunted and no damping has occurred. This corresponds to the period of time shown in FIG. 7 where the damper has been frequency selective and has prevented negative damping, i.e., has prevented reinforcement of the one-third per rev motion. In FIG. 7, this appears as the empty spaces.

Referring now to FIG. 2b and assuming the valve spool to be held momentarily in the position shown therein which corresponds to the retract direction of FIG. 6, two situations will again be considered;

a. In the first situation the piston 36 velocity is assumed to be in the retract direction, i.e., the piston is moving to the right building up pressure in that section of the chamber 34. Fluid is now forced via paths 46 and 51 and inlet 92 into the valve spool chamber 77 and out thereof by means of outlet port 88. The fluid is then forced across load valve 57, through check valve 54 at the left end of flow line 47 and is discharged into the left side of chamber 34 by flow channel 44. In this instance, therefore, damping has occurred since the damper piston velocity, curve D in FIG. 5, and the valve spool displacement, curve E in FIG. 6, are in common sense, i.e., they are both in the retract direction.

b. In this situation the damper piston 36 velocity is assumed to be in the extend direction, i.e., the piston is moving to the left increasing fluid pressure in that section of the chamber 34. Fluid is prevented from flowing into the valve spool chamber via port 91 since the middle land 80 prevents flow between port 91 and port 88. Instead, fluid is forced down path 44 and across check valve 54 at the left end of flow line 48 and, following the path of least resistance, it flows into and out of the chamber 77 by means of ports 88 and 92 respectively. The fluid flows up paths 51 and 46 into the right hand side of chamber 34, thereby bypassing flow valve 57. Again, in this instance no damping has occurred. The damper has been frequency selective and has prevented negative damping of the one-third per rev vibrational component.

It was stated previously that simple static flow description of the damper would not be accurate. Instead, as a result of springs 68 and the hydraulic fluid in control element 23, the hydraulic piston 71 will respond out of phase with the motion of piston 36. Consequently, the motion of spool valve 75 will be out of phase with piston 36 and as shown mathematically, the spool valve displacement will approximate the time integral of the damper piston 36 displacement. Therefore, reliance must be placed on the mathematical analysis of the various equations of motion to develop the curves in FIGS. 4 to 7 and to permit an understanding of the interreactions occurring in the damper. As earlier noted, the spool valve displacement curve E generally corresponds to the one-third per rev velocity curve D and, consequently, the spool valve is generally phased with the one-third per rev vibrational component so that the damping forces are in-phase with the one-third per rev component. Thus, the spool valve motion is such as to provide selective bypassing of hydraulic fluid so as to prevent negative damping and to render the damper frequency selective wherein the damper discriminates between the one-third per rev and the once per rev components. It has also been shown that under the action of a discreet frequency motion, such as a pure one-third per rev, that the damper behaves as a conventional damper.

What has been described are particular embodiments of the damper as used on a three-bladed helicopter rotor. Many advantages have been cited and others will be apparent to those skilled in the art in addition to modifications to the damper within the scope and intention of this invention. Details as to the materials used in making the damper were not given since these are readily apparent to those skilled in the art. Design modifications may be made to the illustrated dampers while remaining within the scope of the inventive concept disclosed herein. The damper may readily be applied to a variety of applications for damping the vibrations of one body moving with respect to another.

What is claimed is:

1. A fluid frequency selective damper for damping the natural frequency vibrations of a movable member moving with respect to a structure to which said member is attached comprising:

a damping means comprising a housing mounted to said structure and having a cooperating damper piston therein dividing said housing into variable volume compartments, said piston being connected to said movable member by a piston rod; first fluid channels adapted to permit the flow of hydraulic fluid from one side of said damper piston to the other;

a second housing connected to said damping means via second fluid channels to enable said fluid to flow between said second housing and said variable volume compartments;

bypass valve means in said second housing for bypassing said fluid around said damper piston when said valve and said damper piston are in predetermined positions relative to each other;

a hydraulic cylinder and piston within said second housing and interconnected with said bypass valve means via third fluid flow channels;

said piston in said hydraulic cylinder being connected to a resilient force-transfer mechanism whereby said piston moves in response to movement of said force transfer mechanism and provides fluid under pressure to said bypass valve means via said third fluid channels; and a mechanical coupling for connecting said resilient force transfer mechanism to said piston rod of said damper piston whereby motion of said movable member is translated through said force transfer mechanism and said piston in said hydraulic cylinder to said bypass valve means for selectively controlling fluid flow across said damper piston for damping said natural frequency vibrations.

2. The damper of claim 1 wherein said force transfer mechanism is a spring capsule comprising a housing, a piston within said housing, a spring on each side of said piston bearing against an end wall of said housing and a rigid connector between said spring capsule piston and said piston in said second housing.

3. The damper of claim 1 wherein said damping means is of the preload type having a preload metering valve located in said first fluid channels for controlling the force velocity relationship of said damping means.

4. The damper of claim 3 wherein said second fluid channels are interconnected with said first fluid channels and said bypass valve means is adapted to bypass fluid around said metering valve when said bypass means and said damper piston are in said predetermined positions relative to each other.

5. The damper of claim 4 wherein said bypass valve means comprises a three-way spool valve and chamber therefor, said second fluid channels comprise three flow paths each in connection with said chamber and said spool valve being adapted to move back and forth in said chamber to interconnect selected pairs of said three-flow paths.

6. The damper of claim 5 wherein a pair of centering springs are provided in said valve chamber, one spring being at each end of said chamber and bearing against said spool valve located between said springs whereby said valve is urged toward the center of said chamber by said springs.

7. A frequency selective damper for use on a helicopter rotor, said damper being operatively mountable between a blade and its associated rotor arm, said damper being selectively responsive to and providing damping forces in opposition to the lower order vibrational frequency motion of said blade about said arm when said rotor is rotated, said damper comprising a damping means and a control means:

said damping means comprising, a first housing mounted to said rotor arm;

a cooperating piston within said housing to divide said housing into variable volume compartments;

means for supplying fluid to said compartments and a piston rod connecting said piston to said blade whereby said piston is adapted to move in said cylinder in response to movement of said blade;

said control means comprising, a second housing having therein a three-way spool valve and chamber therefor in fluid communication with said compartments via fluid flow paths and adapted to control the flow of fluid in one of said compartments to the other upon movement of said piston;

hydraulic pressure means comprising a hydraulic piston and assembly in fluid communication with opposite ends of said spool valve via flow channels for supplying fluid under pressure at one end of said spool pressure upon movement of said hydraulic piston; and a third housing having therein a resilient force transfer mechanism connected at one end by a rigid arm to said hydraulic piston in said second housing and mechanically coupled at the other end to said piston rod of said damper piston.

8. The damper of claim 7 wherein said resilient force transfer mechanism comprises compression springs within and at either end of said third housing with a transfer piston located there between said transfer piston being connected by said rigid arm to said hydraulic piston in said second housing.

9. The damper of claim 7 wherein said damping means is of the preloaded type wherein said means for supplying fluid to said compartments comprises a fluid reservoir connected by flow channels to said compartments, and a spring-loaded metering valve situated in said flow paths for controlling the force-velocity relationship of said damper.

10. The damper of claim 7 wherein a centering spring is positioned at each end of said spool valve chamber bearing against said spool valve and urging same toward the center of said valve chamber.

11. The damper of claim 7 wherein said spool valve chamber is in fluid communication with said compartments via three fluid flow paths and said spool valve is adapted to move back and forth in said chamber interconnecting selected pairs of said flow paths to permit fluid flow into and out of said chamber.

* * * * *